Sept. 30, 1958 A. W. DUNCAN 2,854,127
CONVEYORS
Filed Feb. 7, 1955 3 Sheets-Sheet 2
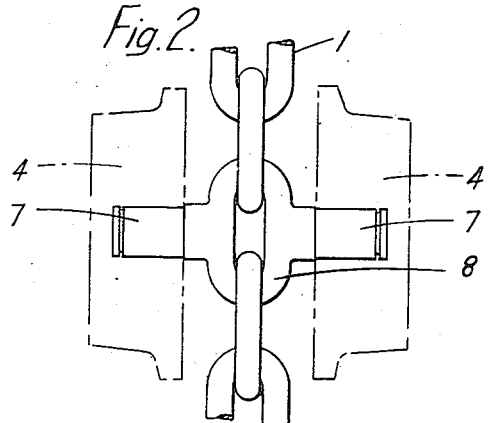
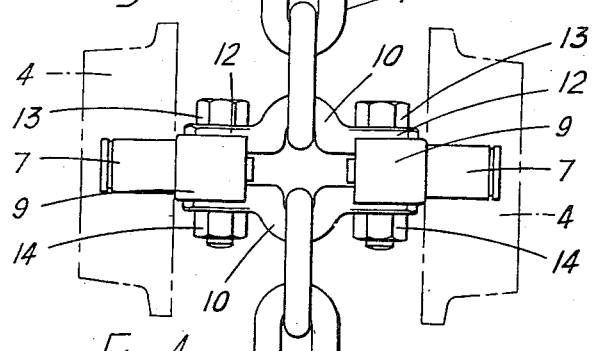
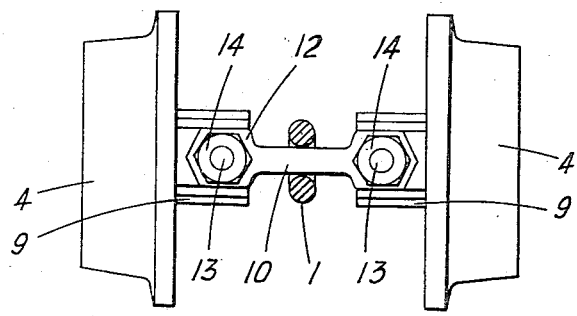
Inventor
Angus W. Duncan Sept. 30, 1958       A. W. DUNCAN            2,854,127
                       CONVEYORS
Filed Feb. 7, 1955                        3 Sheets-Sheet 3
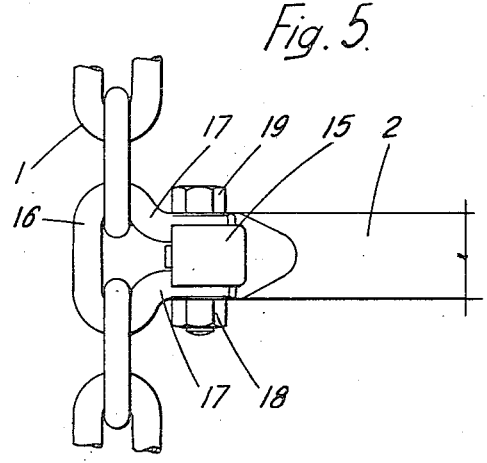
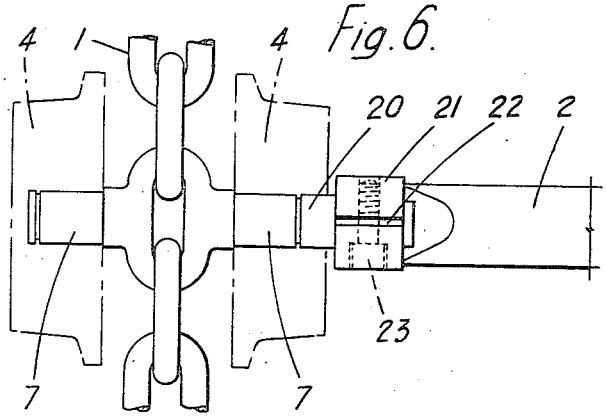
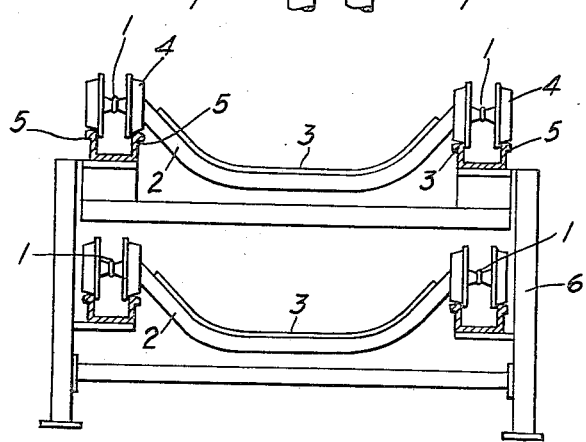

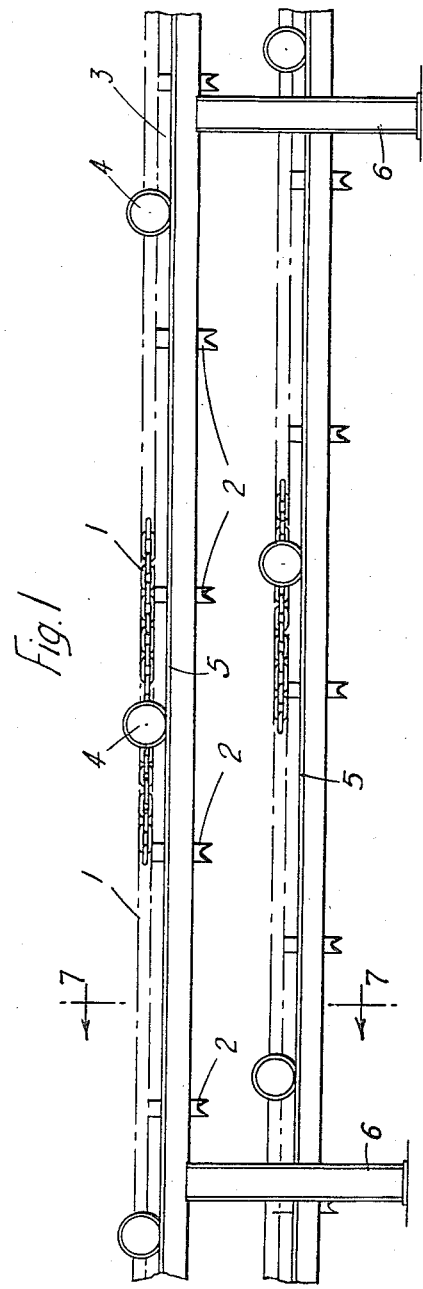

2,854,127
CONVEYORS

Angus W. Duncan, Worcester, England, assignor to The Mining Engineering Company Limited, Worcester, England Application February 7, 1955, Serial No. 486,614

Claims priority, application Great Britain February 10, 1954

2 Claims. (Cl. 198—191)

This invention relates to conveyors in which a load-carrying element such as a flexible belt rests on carriers between tension elements such as a pair of cable link chains, one on each side of the load-carrying element, the chains being supported on rollers running on tracks.

The invention is particularly concerned with the assembly of chain carriers and rollers.

From one aspect, a tension element for a conveyor has according to the invention a series of pairs of rollers spaced along the element, the rollers of each pair being arranged on opposite sides of the element.

From another aspect, in a conveyor of the kind referred to, lengths of cable link chain extend, in accordance with the invention, between pairs of rollers running in double tracks, the rollers being mounted on links of special form connecting the lengths of chain to form a tension element.

Preferably the carriers, on which a belt may rest and which extend between a pair of the chain elements, are connected to the chains intermediate of the positions of the rollers but in some cases the carriers may be connected to the spindle of the rollers.

The arrangements according to the invention have increased load capacity due to the double wheel. They enable a reduction to be effected in the number of wheels as a number of carriers may be used between sets of rollers when transporting heavy material. The roller alignment is independent of differential chain stretch and wear and each pair of rollers is self-tracking.

Other parts of the invention are embodied in the preferred forms which will now be described in some detail by way of example with reference to the accompanying drawings in which:

Fig. 1 is a side view of a section of a conveyor embodying the invention;

Fig. 2 is a plan view showing one method of mounting rollers on a chain;

Figs. 3 and 4 are plan and end views, respectively, of another method of mounting rollers on a chain;

Fig. 5 is a plan view showing a method of mounting a carrier member on a chain;

Fig. 6 is a plan view showing a method of mounting both rollers and a carrier member together on the chain, and Fig. 7 is an enlarged cross-sectional view taken on line 7—7 of Fig. 1.

Referring first to Fig. 1 the tension element of a conveyor comprises two chains made up of matched lengths 1 of cable link chain. The two chains are connected at intervals by transverse carrier members 2 of pressed steel and of trough shape. These carrier members 2 are adapted to support an endless flexible belt 3 which serves as the load-carrying element of the conveyor.

Each chain is supported at intervals by pairs of rollers 4 which run on parallel tracks 5 mounted on the conveyor structure 6. These pairs of rollers 4 are in the form shown in Fig. 1 spaced along the chain at positions spaced from the positions at which the carrier members 2 are connected to the chain. There may be two or more carrier members 2 between each successive pair of rollers 4.

The rollers are mounted on spindles connected to opposite sides of a link of the chain. Several methods may be used for so connecting the spindles.

In the form shown in Fig. 2, spindles 7 are integrally attached to the opposite side of a link 8 of the chain. The two spindles are coaxial and in use are horizontal. The rollers 4 are mounted for free rotation on these spindles.

In the form shown in Figs. 3 and 4, each roller 4 of the pair is mounted for free rotation on a spindle 7 which is integral with a member 9 of I section. The link comprises a pair of members 10 of U-shape with outward extensions 12 from the tops of the limbs, these extensions 12 being flat plates. These plates 12 engage between the flanges of the I-section member 9 and bolts 13 pass through the plates and the webs of the I-section, the assembly being clamped together by nuts 14 tightened on the bolts. The two U-shaped members thus form a closed link to which the other links of the chain are connected.

In another form, one roller of the pair is attached to the link in the manner shown in Fig. 2 and the other is attached in the manner shown in Figs. 3 and 4. The chain link 10 is split at one side and provided with flat projecting lugs at each side of the gap. These lugs engage on each side of the web of an I section member integral with the spindle of a roller. The lugs jam against the flanges of the I section and the assembly is clamped together by a bolt passing through the lugs and the web of the I section, a nut on this bolt tightening the assembly. On the side of the link opposite the split is integrally attached a spindle on which the other roller of the pair is mounted.

When the carriers 2 are mounted between the roller positions they are provided as shown in Fig. 5 with an I section member 15 at each end. This member 15 is similar to the I section member 9 (Figs. 3 and 4) except that it is on the end of the carrier 2. A link 16 of the chain is split and provided with lugs 17 on each side of the gap. These lugs 17 engage on opposite sides of the web of the I section member 15 and are clamped thereto by a nut 18 and bolt 19.

When the carriers are mounted on the chains at the same positions as the rollers, the arrangement shown in Fig. 6 may be used. The spindle 7 of the inner one of the pair of rollers 4 is extended to extend beyond the roller or a separate stub spindle 20 is provided extending outside the roller. The belt carrier 2 is formed with a connecting piece 21 at the end which is bored with a hole to fit the extended spindle 20. A split 22 is made in the connecting piece 21 extending into this hole and a set screw 23 passes across this split. When the connecting piece is mounted on the spindle, this set screw is screwed up to tighten the connecting piece on the spindle to form a rigid connection.

It will be understood that the invention is not restricted to the details of the forms described which may be modified without departing from the broad ideas underlying them.

I claim:

1. A conveyor comprising a pair of spaced parallel tracks, a pair of spaced parallel cable link chain tension elements disposed above said tracks respectively, spaced carrier members extending transversely between said tension elements, a flexible belt resting on said carrier members, pairs of coaxial rollers spaced along each tension element with their common axes transverse to the conveyor, the rollers of each of said pairs being disposed on opposite sides of said tension element and running on the respective one of said parallel tracks, the spindles of each pair of rollers being formed with extended portions of I section and the link to which they are connected comprising a pair of U shaped members having projecting plate like flanges engaging on each side of the web of the I section and clamped thereto.

2. A conveyor comprising a pair of spaced parallel tracks, a pair of spaced parallel cable link chain tension elements disposed above said tracks respectively, spaced carrier members extending transversely between said tension elements, a flexible belt resting on said carrier members, pairs of coaxial rollers spaced along each tension element with their common axes transverse to the conveyor, the rollers of each of said pairs being disposed on opposite sides of said tension element and running on the respective one of said parallel tracks, one side of a link of the chain being split and provided with projecting lugs on each side of the split, said lugs being clamped against the web of an I section extension of the spindle of a roller.

References Cited in the file of this patent

UNITED STATES PATENTS

| | | |
|---|---|---|
| 1,000,107 | Morris | Aug. 8, 1911 |
| 1,047,273 | Morris | Dec. 17, 1912 |
| 1,945,300 | West et al. | Jan. 30, 1934 |
| 2,507,025 | Lemmon | May 9, 1950 |
| 2,727,617 | Thomson | Dec. 20, 1955 |
| 2,763,361 | Foster | Sept. 18, 1956 |

FOREIGN PATENTS

| | | |
|---|---|---|
| 733,714 | Great Britain | July 20, 1955 |
| 807,504 | Germany | June 28, 1951 |
| 893,022 | Germany | Oct. 12, 1953 |
| 1,059,196 | France | Nov. 10, 1953 |